US008947198B2

(12) United States Patent
Guralnik et al.

(10) Patent No.: US 8,947,198 B2
(45) Date of Patent: Feb. 3, 2015

(54) BOOTSTRAPPING ACCESS MODELS IN THE ABSENCE OF TRAINING DATA

(75) Inventors: Valerie Guralnik, Orono, MN (US); Vit Libal, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 207 days.

(21) Appl. No.: 13/397,009

(22) Filed: Feb. 15, 2012

(65) Prior Publication Data

US 2013/0207775 A1 Aug. 15, 2013

(51) Int. Cl.
*G05B 19/00* (2006.01)

(52) U.S. Cl.
USPC .......................................................... 340/5.21

(58) Field of Classification Search
USPC ............................ 340/5.21, 3.1, 5.8; 235/382
See application file for complete search history.

(56) References Cited

U.S. PATENT DOCUMENTS

2011/0221565 A1* 9/2011 Ludlow et al. ................. 340/5.6

OTHER PUBLICATIONS

"European Application Serial No. 13153939.7, European Search Report mailed Jul. 2, 2014", 2 pgs.

"European Application Serial No. 13153939.7, Office Acttion mailed Jul. 11, 2014", 6 pgs.

Chandola, V, et al., "Anomaly Detection: A Survey", ACM Computing Survey, (Sep. 2009), 1-72.

Denning, D E, "An Intrusion-Detection Model", IEEE Transactions on Software Engineering, vol. SE-13, No. 2, (Feb. 1987), 222-232.

Smaha, S E, "Haystack: an intrusion detection system", *Proceedings of the Aerospace Computer Security Applications Conference*, Orlando, FL, (1988), 37-44.

* cited by examiner

*Primary Examiner* — Vernal Brown

(74) *Attorney, Agent, or Firm* — Schwegman Lundberg & Woessner, P.A.

(57) ABSTRACT

A plurality of access models comprise patterns of accesses to resources protected by an Access Control System (ACS). The access models are used to classify the accesses to the resources as either normal or anomalous. The system stores attributes for the individuals for whom the access models are available, receives attributes of an individual not associated with an access model, and compares the attributes of the individual not associated with an access model to the attributes of the individuals for whom access models are available. The system further selects an access model for the individual not associated with an access model based on the comparison, and uses the selected access model for the individual not associated with an access model to classify access to the one or more resources protected by the ACS by the individual not associated with an access model as either normal or anomalous.

20 Claims, 4 Drawing Sheets

A

140 DETERMINE, BY ANALYZING ATTRIBUTES OF THE INDIVIDUAL OR GROUP OF INDIVIDUALS SELECTED TO BUILD THE GROUP ACCESS MODEL, AND BEFORE THE CONSTRUCTION OF THE GROUP ACCESS MODEL, WHETHER THE INDIVIDUAL OR GROUP OF INDIVIDUALS SELECTED TO BUILD THE GROUP ACCESS MODEL REPRESENT A COHESIVE GROUP.

145 THE GROUP ACCESS MODEL CAN BE CONSTRUCTED BY ONE OR MORE OF A BUILDING OF THE ACCESS MODELS FROM THE RECORDS OF PAST ACCESS DATA OF THE INDIVIDUAL OR GROUP OF INDIVIDUALS USED TO BUILD THE GROUP ACCESS MODEL, AN AGGREGATION OF THE ACCESS MODELS OF THE INDIVIDUALS USED TO BUILD THE GROUP ACCESS MODEL, AND A DETERMINATION OF REPRESENTATIVE ACCESS MODELS FROM AMONG THE ACCESS MODELS OF THE INDIVIDUALS USED TO BUILD THE GROUP ACCESS MODEL.

150 DETERMINE THAT THE ACCESS MODELS DIFFER FROM EACH OTHER, SELECT ONE OR MORE SUBSETS FROM THE PLURALITY OF ACCESS MODELS THAT ARE SIMILAR, AND USE THE ONE OR MORE SIMILAR SUBSETS OF ACCESS MODELS AS AN ACCESS MODEL FOR THE INDIVIDUAL NOT ASSOCIATED WITH AN ACCESS MODEL.

155 SELECT THE ONE OR MORE SUBSETS OF ACCESS MODELS BY A VOTING SCHEME OR AN AGGREGATION SCHEME.

160 THE RESOURCES OF THE ORGANIZATION CAN INCLUDE A PHYSICAL RESOURCE, A CYBER RESOURCE, AND/OR AN INTELLECTUAL PROPERTY RESOURCE.

165 THE INDIVIDUAL NOT ASSOCIATED WITH AN ACCESS MODEL IS A NEW USER OF THE RESOURCES PROTECTED BY THE ACS WHO DOES NOT HAVE A HISTORY OF ACCESS TO THE ONE OR MORE RESOURCES PROTECTED BY THE ACS.

170 RECEIVE, OVER A PERIOD OF TIME, ACCESS DATA FOR THE INDIVIDUAL NOT ASSOCIATED WITH AN ACCESS MODEL. THIS ACCESS DATA RELATES TO THE INDIVIDUAL NOT ASSOCIATED WITH AN ACCESS MODEL ACCESSING THE ONE OR MORE RESOURCES PROTECTED BY THE ACS.

B

BOOTSTRAPPING ACCESS MODELS IN THE ABSENCE OF TRAINING DATA

TECHNICAL FIELD

The present disclosure relates to a system and method for bootstrapping access models in the absence of training data.

BACKGROUND

In access control systems, statistical models are used to assess an individual's access patterns that describe access patterns related to individuals, groups of individuals, and/or locations, and possibly to detect unusual or anomalous behavior that may indicate a security threat. The reliability of a statistical model however depends on having an appreciable amount of data. This data is used to build the model. Therefore, building a statistical model of access patterns may result in unreliable models due to insufficient data. This will typically happen when a new user is introduced to the access control system, wherein during the first weeks or months after his/her introduction, there is not enough data available to build a model for this user.

DETAILED DESCRIPTION

Figure 1A:
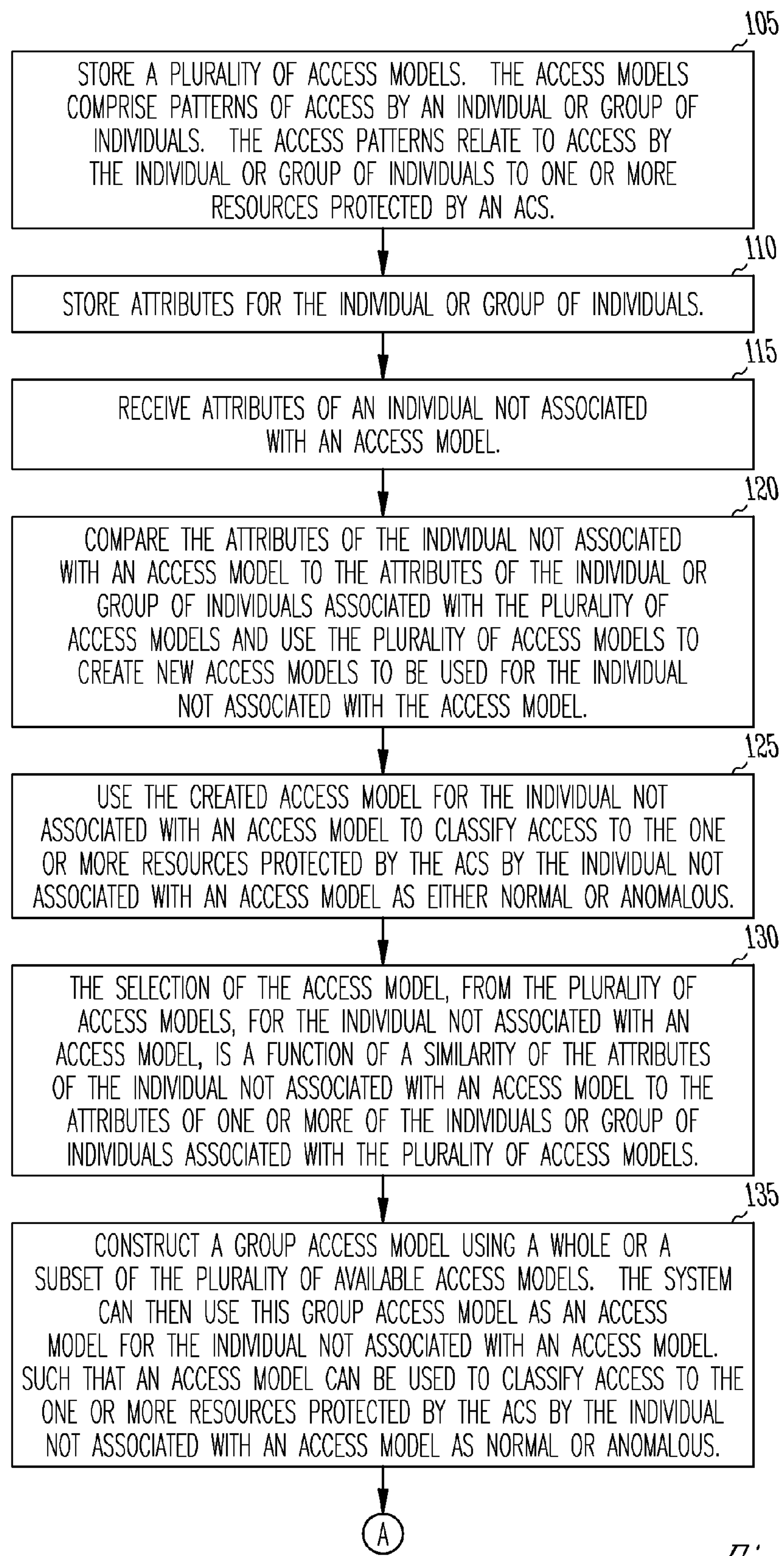
FIGS. 1A, 1B, and 1C are a diagram of the features of a system and method that bootstraps access models in the absence of training data.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An Access Control System (ACS) is a system that controls users' access to a building or facility by its users. An individual user (further referred to as a "user" or an "individual") possesses credential, typically a badge or card, and the user presents the credentials to a reader at the point of access (a door, a gate, etc.). The reader conveys the user's credentials to the ACS system. The ACS then either denies or grants access to the user based on the access policies assigned for that user and point of access.

An access policy (or access rights) is a set of rules according to which the ACS grants users access at a particular reader. The access rights may be assigned to a combination of each individual user and each individual reader. Usually users with similar needs are grouped together and the access rights are assigned to the group of users. If a new user is assigned to a group of users, he automatically gets assigned the access rights of that group. Similarly, the readers may be grouped together as well so that the access rights are assigned to a user group and reader group.

Attributes of a user of an ACS include information about this user that relates in some way to the ACS. Examples include a job function, a work location, an assignment to a group of users, any information contained in a personnel file, etc.

Access patterns are the way that a user uses the ACS. Examples of access patterns include a time of access to a certain reader, a frequency of accesses to a certain reader, etc. The access pattern corresponds to a user's behavior.

An access model is a generalization of access patterns. It is built on some amount of historical data and describes the "usual" access patterns. In other words, it describes what is normal and what is unusual or anomalous. The access model may describe usual access patterns of each individual user at each individual reader, it may describe usual access patterns of a group of users at each individual reader, it may describe usual access patterns of a group of users at group of readers, or some similar situation.

An ACS operator is a person that operates ACS by watching the outputs, responding to alerts, assigning the users the access rights, and other tasks.

An embodiment provides a solution to the problem of an inability to build an accurate and reliable access model for an access control system to detect unusual and anomalous behavior because of insufficient data for an individual. Specifically, to overcome a lack of historical (training) data for certain individuals, the system and method use data (or models) of other individuals who are most likely to have similar access pattern to the individual for whom data is lacking. A consideration in identifying the individuals with similar access patterns is their function with respect to secured buildings and/or spaces (e.g., their roles and/or jobs if the individuals are employees of a company that is located and/or functioning within the building and/or space, or other attributes as specified above in paragraph [0008]).

One way to determine an access pattern similarity is by using an employee personnel file (if the personnel file is available to the ACS operator). This use, however, can result in many individuals being grouped together due to the same job title, while not performing similar functions in a similar way (accessing the same physical resources), and therefore not exhibiting the same access patterns. In an embodiment, a solution is to use access control policies to narrow the pool of candidate individuals whose access data can be used to construct the model. Access control policy to physical resources determines locations within the secured building and/or space, and the times where and/or when an individual is allowed to enter. Additionally, access control policies to virtual resources can be indicative of the type of work and/or projects with which an individual is involved. Using all available attributes of an individual, the system and method can determine a small group of other individuals who most likely will have similar access patterns. The data of those similar individuals can then be used to build an initial model of the individual who lacks training data.

In another embodiment, the system and method can determine whether or not individuals with similar job functions or other attributes represent a cohesive group based on access patterns of these individuals (either through direct comparison of their statistical access models or using clustering methods). A group of individuals is cohesive if the similarity of access models of these individuals is large enough with respect to a predefined similarity metric. If the individuals represent a cohesive group, then the system and method can build a group model using a union of the data of all users of this group. In another embodiment, the system and method aggregates individual models of each individual to form a group model that will be more reliable. In the case wherein the access patterns of the individuals with similar job function differ, aggregating their individual models into a single group model could result in an inaccurate model that would not reflect access patterns of any these individuals and thus would not be capable of description of their future behavior (distinguishing the normal access patterns from unusual/anomalous access patterns). In such a case, the system and method use multiple models that are representative of different access patterns within the group, and aggregate the anomaly detection (i.e., normal vs. unusual/anomalous access pattern classification) results from these models (either through majority voting, or some other aggregation scheme). As the individual who lacks the model training data continues to use the access control system, the amount of the individual's access data increases. When a predefined amount of data is collected, the system and method can use a meta-classifier to determine which pre-existing model (of a group or of an individual) fits the individual's access data the best. Then, this model can be used to describe the individual's access patterns until enough data for that individual is collected and his or her reliable individual model may be build. Additionally, as the individual's access data continue to be collected, it may be used to update the initial models leading to further increases of precision and reliability of anomalous access pattern detection.

Figure 1B:
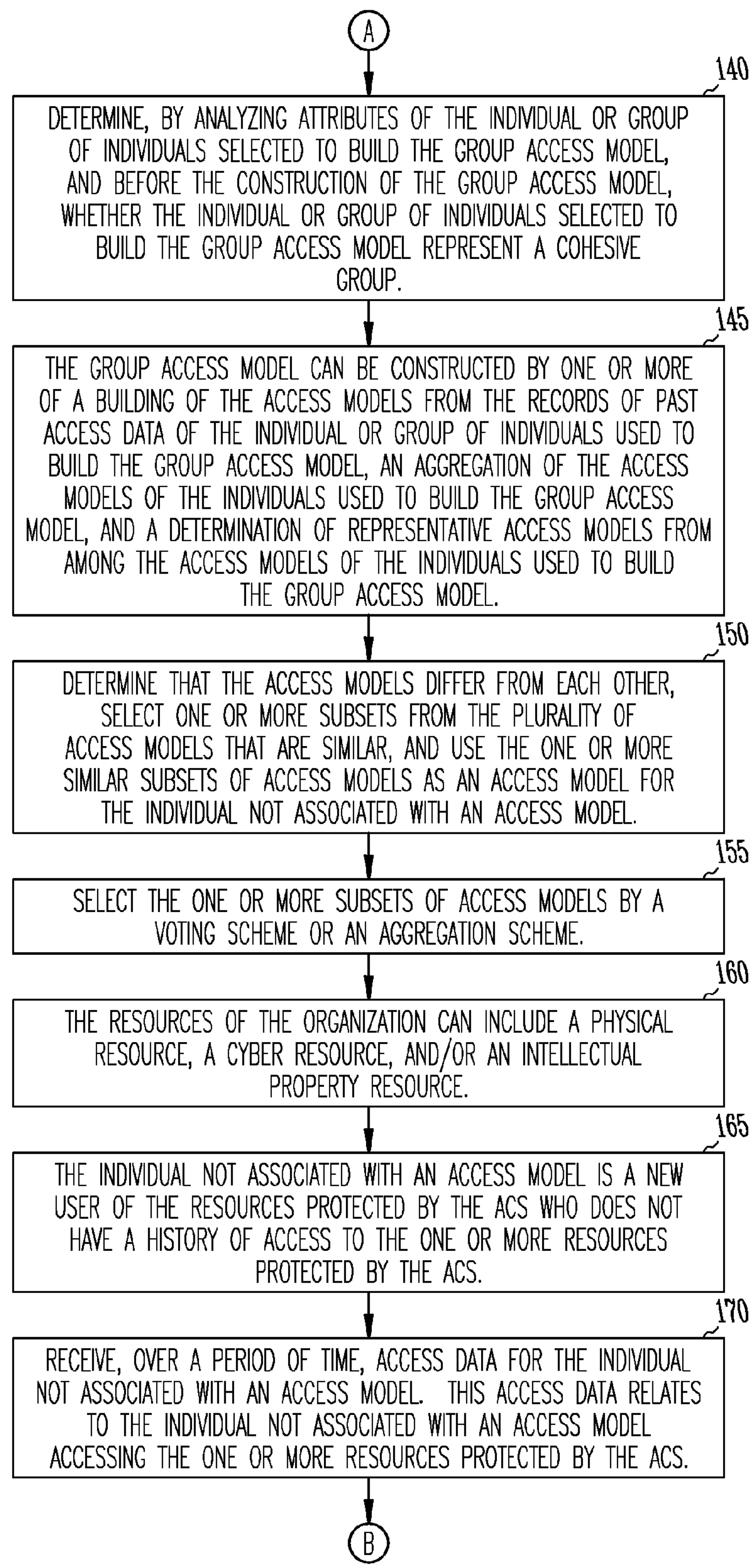
Figure 1C:
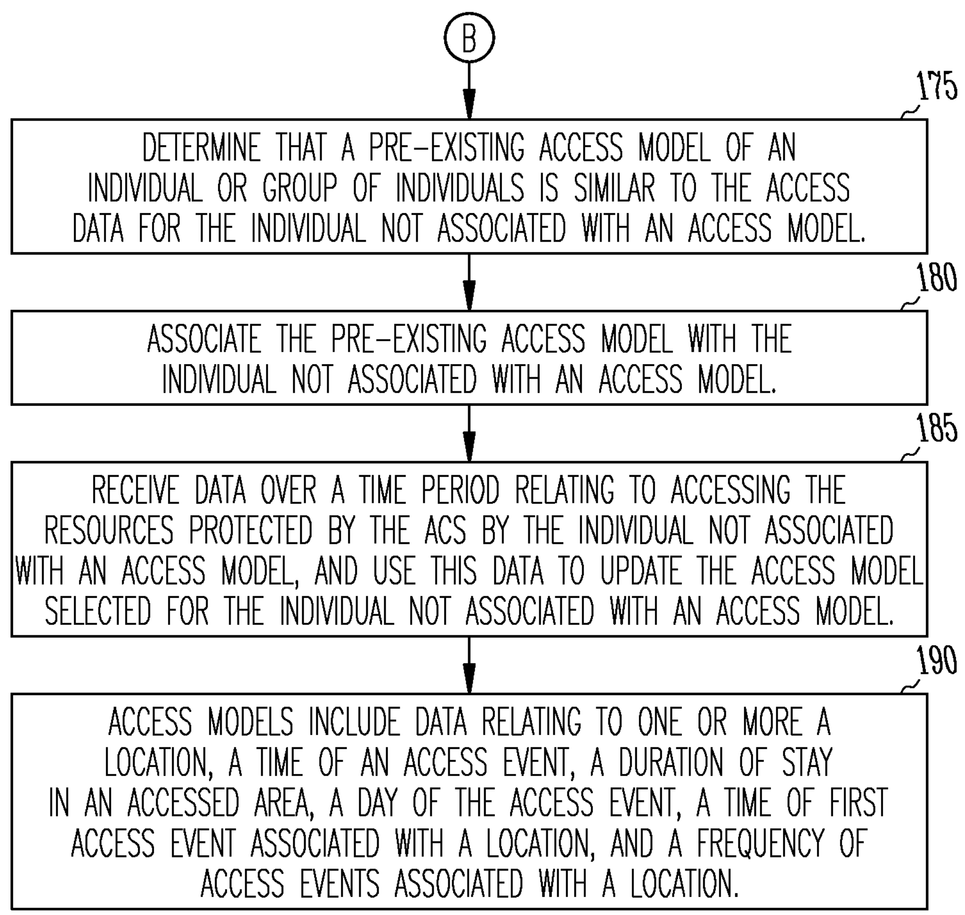

FIGS. 1A, 1B, and 1C are a flowchart-like diagram of features of a system and method for bootstrapping access models in the absence of training data. FIGS. 1A, 1B, and 1C include a number of process blocks 105-190. Though arranged serially in the example of FIGS. 1A, 1B, and 1C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 1A, 1B, 1C, and 2, a system includes one or more of a computer processor (21) and a computer storage device (22). The system is configured to store a plurality of access models (105). The access models comprise patterns of access by an individual, or access patterns of a group of individuals. The access patterns relate to access by the individual or group of individuals to one or more resources protected by the ACS. The system stores attributes for the individual or group of individuals (110), receives attributes of an individual having no access model (115), and compares the attributes of the individual having no access model to the attributes of the individual or group of individuals for whom access models are available. The system selects an access model, from the plurality of available access models, for the individual having no access model based on the comparison (120), and uses the selected access model for the individual having no access model to classify access to the one or more resources protected by the ACS by the individual having no access model as either normal or anomalous (125).

In an embodiment, the selection of the access model, from the plurality of access models, for the individual having no access model, is a function of a similarity of the attributes of the individual having no access model to the attributes of one or more of the individuals or group of individuals for whom the access models are available (130).

The system can be configured to construct a group access model using a whole or a subset of the plurality of available access models. Examples of subsets of statistical models are components of mixture type statistical models (e.g., Gaussian Mixture Models). Other examples of subsets of statistical models are clusters, in the feature space, of the non-parametric statistical models. The system can then use this group access model as an access model for the individual who has no access model. Such an access model can be used to classify access to the one or more resources protected by the ACS by the individual having no access model as normal or anomalous. (135) The system can further be configured to determine, by analyzing attributes of the individuals selected to build the group access model, and before the construction of the group access model, whether the individuals selected to build the group access model represent a cohesive group. (140) For example, the system can check to determine if the individuals used to build the group access model have access rights to different resources, even though they may share the same job title or function. Additionally, the group access model can be constructed by one or more of a building of the access models from the records of past access data of the individuals used to build the group access model, an aggregation of the access models of the individuals used to build the group access model, and a determination of representative access models from among the access models of the individuals used to build the group access model. (145)

The system can further determine that the access models differ from each other, select one or more subsets from the plurality of access models that are similar, and use the one or more similar subsets of access models as an access model for the individual having no access model. (150) The system can also select the one or more subsets of access models by a voting scheme or an aggregation scheme. (155) The resources protected by the ACS can include a physical resource, a cyber resource, and/or an intellectual property resource. (160) In many circumstances, the individual having no access model is a new user of the resources protected by the ACS who does not have a history of access to the resources protected by the ACS. (165)

In another embodiment, the system can be configured to receive over a period of time access data for the individual having no access model. This access data relates to the individual having no access model accessing the one or more protected resources. (170). The system can then determine that a pre-existing access model of an individual or group of individuals is similar to the access data for the individual having no access model, (175) and the system can associate the pre-existing access model with the individual having no access model. (180).

The system can receive data over a time period relating to accessing the resources protected by the ACS by the individual having no access model, and the system can then use this data to update the access model selected for the individual having no access model. (185) As noted above, the access model includes patterns of access by an individual, or a group of individuals, to one or more resources protected by the ACS. Normally, these access models include data relating to one or more a location (i.e., what resource a person is allowed to access), a time of an access event, a duration of a stay in an accessed area, a day of the access event, a time of a first access event associated with a location, and a frequency of access events associated with a location. (190)

Figure 2:
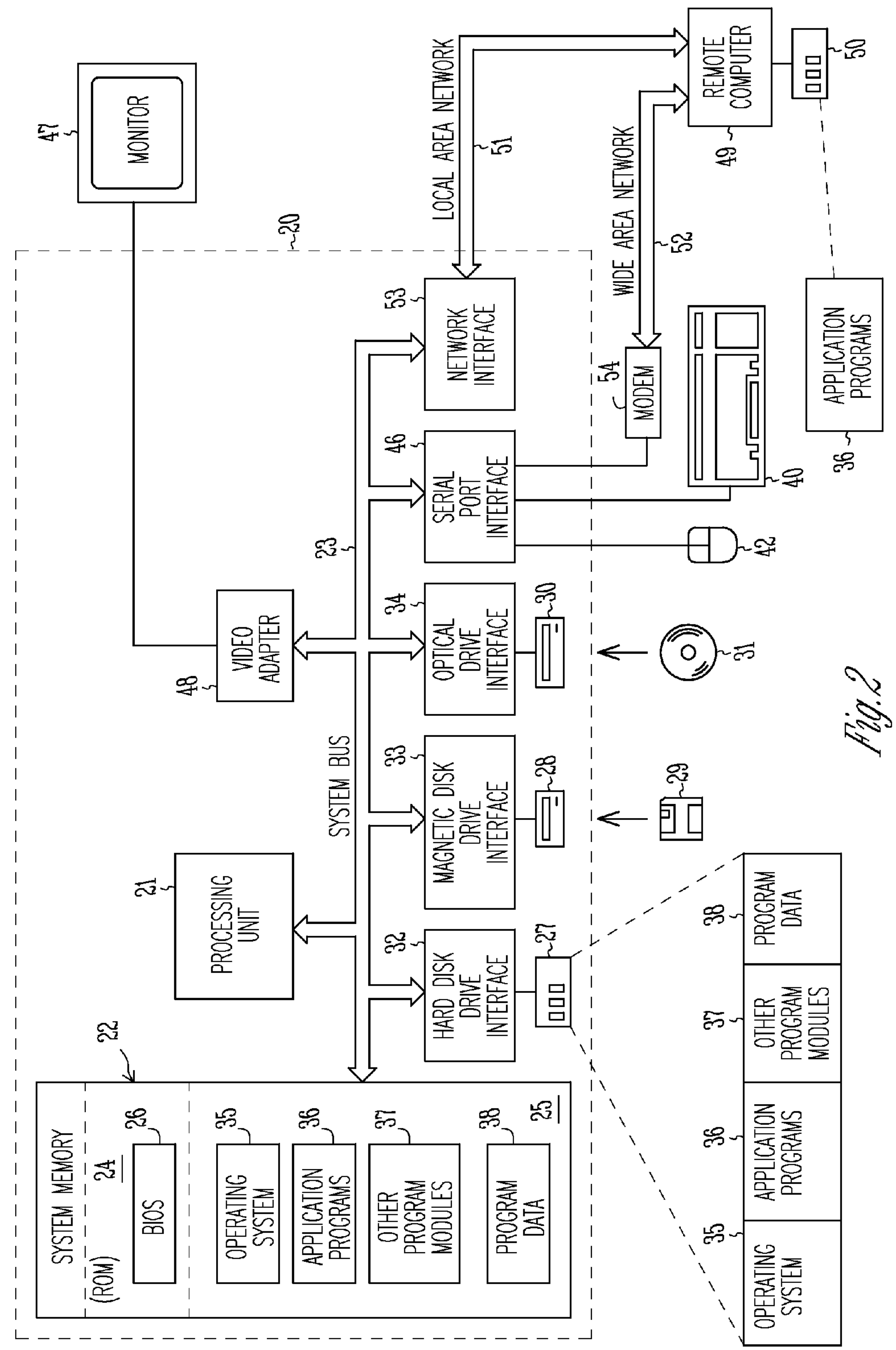
FIG. 2 is a block diagram of a computer system upon which embodiments of the present disclosure can execute.

FIG. 2 is an overview diagram of hardware and an operating environment in conjunction with which embodiments of the invention may be practiced. The description of FIG. 2 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 2, a hardware and operating environment is provided that is applicable to any of the servers and/or remote clients shown in the other Figures.

As shown in FIG. 2, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user of the system may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user of the system. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 2 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:

one or more of a computer processor and a computer storage device configured to:

store a plurality of access models used by an access control system (ACS), wherein the access models comprise patterns of access by an individual or a group of individuals to one or more resources protected by the ACS;

store attributes for the individual or group of individuals;

receive attributes of an individual not associated with an access model;

compare the attributes of the individual not associated with an access model to the attributes of the individual or group of individuals who are associated with one or more of the plurality of access models;

use the plurality of access models to create new access models to be used for the individual not associated with the access model; and use the created access models for the individual not associated with an access model to classify access to the one or more resources protected by the ACS by the individual not associated with an access model as either normal or anomalous.

2. The system of claim 1, wherein the new access models to be used for the individual not associated with an access model are created by selection from the plurality of access models used by the ACS.

3. The system of claim 2, wherein the selection from the plurality of access models used by the ACS for the individual not associated with an access model is a function of a similarity of the attributes of the individual not associated with an access model to the attributes of one or more of the individual or group of individuals who are associated with one or more of the plurality of access models used by the ACS.

4. The system of claim 3, wherein the attributes include one or more of a job function, a work location, an assignment to a group of users, and information contained in a personnel file.

5. The system of claim 2, wherein the creation from the plurality of access models used by the ACS for the individual not associated with an access model is performed such that the selected models from the plurality of access models used by the ACS are associated with individuals that represent a cohesive group.

6. The system of claim 1, wherein the new access models to be used for the individual not associated with an access model are created by building the new access models from records of past access data of the individuals who represent a cohesive group of individuals.

7. The system of claim 1, wherein the new access models to be used for the individual not associated with an access model are created by one or more of aggregation of access models of individuals who represent a cohesive group of individuals, and a determination of representative access models from among the access models of the individuals who represent a cohesive group of individuals.

8. The system of claim 1, wherein the new access models to be used for the individual not associated with an access model are created by one or more of aggregation of selected subsets of access models of individuals who represent a cohesive group of individuals and a determination of representative subsets of access models from among the access models of the individuals who represent a cohesive group of individuals.

9. The system of claim 1, wherein the created access models for the individual not associated with an access model are used to classify access to the one or more resources protected by the ACS by the individual not associated with an access model as either normal or anomalous in such a way that the classification comprises a voting scheme or an aggregation of partial classification results of each access model component of the created access models.

10. The system of claim 1, wherein the resources protected by the ACS comprise one or more of a physical resource, a cyber resource, and an intellectual property resource.

11. The system of claim 1, wherein the person not associated with an access model is a new user of the resources protected by the ACS who does not have a history of access to the one or more resources protected by the ACS.

12. The system of claim 1, wherein the computer processor is configured to receive data over a time period relating to accessing the resources protected by the ACS by the individual not associated with an access model, and to update the access model selected for the individual not associated with an access model using the data.

13. The system of claim 1, wherein the access models comprise values relating to one or more of a location, a time of an access event, a duration of stay in an accessed area, a day of the access event, a time of a first access event associated with a location, and a frequency of access events associated with a location.

14. A method comprising:

storing a plurality of access models used by an access control system (ACS), wherein the access models comprise patterns of access by an individual or a group of individuals to one or more resources protected by the ACS;

storing attributes for the individual or group of individuals;

receiving attributes of an individual not associated with an access model;

comparing the attributes of the individual not associated with an access model to the attributes of the individual or group of individuals who are associated with one or more of the plurality of access models;

using the plurality of access models to create new access models to be used for the individual not associated with the access model; and using the created access models for the individual not associated with an access model to classify access to the one or more resources protected by the ACS by the individual not associated with an access model as either normal or anomalous.

15. The method of claim 14, wherein the new access models to be used for the individual not associated with an access model are created by selection from the plurality of access models used by the ACS; and wherein the selection from the plurality of access models used by the ACS for the individual not associated with an access model is a function of a similarity of the attributes of the individual not associated with an access model to the attributes of one or more of the individual or group of individuals who are associated with one or more of the plurality of access models used by the ACS.

16. The method of claim 15, wherein the creation from the plurality of access models used by the ACS for the individual not associated with an access model is performed such that the selected models from the plurality of access models used by the ACS are associated with individuals that represent a cohesive group.

17. The method of claim 14, wherein the new access models to be used for the individual not associated with an access model are created by one or more of aggregation of access models of individuals who represent a cohesive group of individuals, and a determination of representative access models from among the access models of the individuals who represent a cohesive group of individuals.

18. The method of claim 14, wherein the new access models to be used for the individual not associated with an access model are created by one or more of aggregation of selected subsets of access models of individuals who represent a cohesive group of individuals and a determination of representative subsets of access models from among the access models of the individuals who represent a cohesive group of individuals.

19. The method of claim 14, wherein the person not associated with an access model is a new user of the resources protected by the ACS who does not have a history of access to the one or more resources protected by the ACS.

20. A non-transitory computer readable storage device comprises instructions that when executed by a processor execute a process comprising:

storing a plurality of access models used by an access control system (ACS), wherein the access models comprise patterns of access by an individual or a group of individuals to one or more resources protected by the ACS;

storing attributes for the individual or group of individuals;

receiving attributes of an individual not associated with an access model;

comparing the attributes of the individual not associated with an access model to the attributes of the individual or group of individuals who are associated with one or more of the plurality of access models;

using the plurality of access models to create new access models to be used for the individual not associated with the access model; and using the created access models for the individual not associated with an access model to classify access to the one or more resources protected by the ACS by the individual not associated with an access model as either normal or anomalous.

* * * * *